(12) United States Patent
Ishimoto

(10) Patent No.: US 8,683,227 B2
(45) Date of Patent: Mar. 25, 2014

(54) COMMUNICATION SYSTEM FOR UPDATING OLD DATA WITH NEW DATA

(75) Inventor: Kan Ishimoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1569 days.

(21) Appl. No.: 11/847,235

(22) Filed: Aug. 29, 2007

(65) Prior Publication Data

US 2008/0059810 A1 Mar. 6, 2008

(30) Foreign Application Priority Data

Aug. 29, 2006 (JP) ................................ 2006-232001

(51) Int. Cl.
*G06F 12/14* (2006.01)

(52) U.S. Cl.
USPC ........... 713/193; 713/189; 713/190; 380/255; 380/259; 380/260

(58) Field of Classification Search
USPC ........................................................ 713/193
See application file for complete search history.

(56) References Cited

U.S. PATENT DOCUMENTS

| | | | |
|---|---|---|---|
| 5,734,718 A | 3/1998 | Prafullchandra | |
| 5,826,016 A | 10/1998 | Ito et al. | |
| 6,769,060 B1 | 7/2004 | Dent et al. | |
| 7,039,190 B1 * | 5/2006 | Engwer et al. | 380/270 |
| 7,248,833 B2 * | 7/2007 | Lee | 455/41.2 |
| 7,373,509 B2 | 5/2008 | Aissi et al. | |
| 2003/0070067 A1 | 4/2003 | Saito | |
| 2003/0074567 A1 | 4/2003 | Charbonneau | |
| 2003/0093680 A1 | 5/2003 | Astley et al. | |

(Continued)

FOREIGN PATENT DOCUMENTS

| | | |
|---|---|---|
| JP | H08-320847 A | 12/1996 |
| JP | H09-231174 A | 9/1997 |

(Continued)

OTHER PUBLICATIONS

Japanese Patent Office, Office Action, Notification of Reasons for Rejection for Japanese Patent Application No. 2006-232002, mailed Sep. 9, 2008.

(Continued)

*Primary Examiner* — Aravind Moorthy
*Assistant Examiner* — Jason Plotkin
(74) *Attorney, Agent, or Firm* — Baker Botts L.L.P.

(57) ABSTRACT

A communication system is provided with an information processing device, and a management device capable of updating old data stored in the information processing device by outputting new data to the information processing device. The management device is provided with an old data input device that inputs the old data, a first new data input device that inputs the new data, an encryption device that encrypts the new data by utilizing the old data as a key, and a new data output device that outputs the new data encrypted by the encryption device to the information processing device. The information processing device is provided with an old data storage that stores the old data, a second new data input device that inputs the encrypted new data output by the management device, a decryption device that decrypts the encrypted new data by utilizing the old data as a key, and an updating device that updates the old data stored in the old data storage to the new data decrypted by the decryption device.

18 Claims, 7 Drawing Sheets

(56) References Cited

U.S. PATENT DOCUMENTS

| | | | |
|---|---|---|---|
| 2004/0081320 A1* | 4/2004 | Jordan et al. | 380/247 |
| 2005/0149730 A1 | 7/2005 | Aissi et al. | |
| 2006/0036857 A1 | 2/2006 | Hwang | |
| 2006/0215703 A1 | 9/2006 | Honda | |
| 2006/0265334 A9 | 11/2006 | Cutter et al. | |
| 2007/0036353 A1 | 2/2007 | Reznik et al. | |
| 2007/0120651 A1 | 5/2007 | Kobayashi et al. | |
| 2007/0220261 A1* | 9/2007 | Farrugia et al. | 713/176 |
| 2008/0059796 A1 | 3/2008 | Ishimoto | |
| 2009/0113522 A1* | 4/2009 | Crassous et al. | 726/4 |

FOREIGN PATENT DOCUMENTS

| | | |
|---|---|---|
| JP | H11-296466 A | 10/1999 |
| JP | 2000-059355 A | 2/2000 |
| JP | 2001-265731 A | 9/2001 |
| JP | 2001-265735 A | 9/2001 |
| JP | 2002-330122 A | 11/2002 |
| JP | 2005-114870 A | 4/2005 |
| JP | 2005-509938 A | 4/2005 |
| JP | 2005-252347 A | 9/2005 |
| WO | 2005-089088 A2 | 9/2005 |

OTHER PUBLICATIONS

Japan Patent Office; Notice of Reasons for Rejection in Japanese Patent Application No. 2006-232002 mailed Apr. 14, 2009.
European Patent Office: European Search Report in Application No. 07253399.5 mailed Nov. 28, 2007.
Japanese Patent Office, Notice of Reasons for Rejection for Japanese Patent Application No. 2006-232001, mailed Jul. 22, 2008.
U.S. Patent and Trademark Office, Office Action for U.S. Appl. No. 11/847,325, dated Dec. 14, 2010.
U.S. Patent and Trademark Office, Final Office Action for co-pending U.S. Appl. No. 11/847,325, with notification date of May 20, 2011.
European Patent Office, Office Action for European Patent Application No. 07253399.5-2413, dated Apr. 10, 2012.
United States Patent and Trademark Office, Non-Final Office Action for U.S. Appl. No. 11/847,325 (related U.S. patent application) issued Apr. 26, 2013.

* cited by examiner

COMMUNICATION SYSTEM FOR UPDATING OLD DATA WITH NEW DATA

CROSS-REFERENCE TO RELATED APPLICATION

This application claims priority to Japanese Patent Application No. 2006-232001, filed on Aug. 29, 2006, the contents of which are hereby incorporated by reference into the present application.

BACKGROUND OF THE INVENTION

1. Field of the Invention

The present invention relates to a communication system comprising an information processing device and a management device communicably connected thereto. In particular, the present invention relates to a communication system that can update old data stored in the information processing device to new data that was output from the management device.

2. Description of the Related Art

For example, a communication system that is communicably connected to a printer and a PC by means of a local area network (LAN) is known. An example of this type of communication system is disclosed in Japanese Patent Application Publication No. 11-296466. A user can send commands to a printer by operating a PC. For example, a user can update each type of printer setting data by operating the PC.

Updating each type of printer setting data should be limited to authorized personnel in order to prevent operational errors or the like in the printer. The aforementioned document requires the input of a password when application software installed in the PC that will update each type of printer setting data is to be run. When the appropriate password has been input, the application software will be run, and each type of printer setting data will be allowed to be updated. On the other hand, technology that performs user identification by an accessing device sending a password to a device to be accessed is widely known. Note that it is preferable to periodically update a password in order to improve security.

BRIEF SUMMARY OF THE INVENTION

Security should be maintained during network transmission. Because of that, encryption technology is used. With well-known encryption technology, in order to encrypt data (a password in the aforementioned example) to be transmitted between devices, a key for encryption (and decryption) will be transmitted separately from the data. The present specification provides technology that can transmit an encryption key with a novel method. The technology disclosed by the present specification is optimally used in a communication system that updates old data (e.g., an old password) stored in an information processing device with new data (e.g., a new password) that was input to a management device.

Technology disclosed by the present specification will be described with reference to FIG. 1. FIG. 1 shows an example of a communication system. Note that FIG. 1 is merely an example. The scope of the technology disclosed in the specification should not be narrowly interpreted by means of the content of FIG. 1 and the following explanation related thereto. The scope of the present invention is to be objectively construed by the contents disclosed in the claims. A communication system 2 comprises a management device 10 and an information processing device 25. The management device 10 can update old data stored in the information processing device 25 by outputting new data to the information processing device 25.

The management device 10 comprises an old data input device 12, a first new data input device 14, an encryption device 16, and a new data output device IS. The old data input device 12 inputs old data (e.g., D1). For example, a user of the management device 10 may store the old data. The user may input the old data D1 that he or she has stored into the management device 10 in the event that the old data D1 stored in the information processing device 25 is to be updated to new data (e.g., D2). On the other hand, the management device 10 may also continuously store the old data D1 that was previously input. In this case, the user may not need to input the old data D1 into the management device 10 in the event that the old data D1 is to be updated to the new data D2. The first new data input device 14 inputs the new data D2. The new data D2 may be input to the management device 10 by a user. Note that the old data input device 12 and the first new data input device 14 may be constructed to be separate from each other, or may be constricted to be integral with each other. The encryption device 16 encrypts the new data D2 input to the first new data input device 14 by utilizing the old data D1 input to the old data input device 12 as a key. The new data D2 that was encrypted with D1 as a key will be expressed as F(D2, D1). The new data output device 18 outputs the new data E(D2, D1) encrypted by the encryption device 16 to the information processing device 25.

The information processing device 25 comprises an old data storage 30, a second new data input device 32, a decryption device 34, and an updating device 36. The old data storage 30 stores the old data D1. The old data D1 is data that was previously input to the management device 10. The second new data input device 32 inputs the encrypted new data E(D2, D1) that was output by the management device 10. The decryption device 34 decrypts the encrypted new data E(D2, D1) input to the second data input device 32 by utilizing the old data D1 stored in the old data storage 30 as a key. The updating device 36 updates the old data D1 stored in the old data storage 30 to the new data D2 decrypted by the decryption device 34.

The aforementioned management device 10 will use the old data D1 to encrypt the new data D2. As noted above, the management device 10 may continuously store the old data D1 that was previously input, and use this old data D1 to encrypt the new data D2. On the other hand, the management device 10 may require a user to input both the new data D2 and the old data D1, and use this old data D1 to encrypt the new data D2. The information processing device 25 can decrypt the encrypted new data E(D2, D1) by utilizing the old data D1 that is stored in the old data storage 30 as a key. In this way, the old data D1 can be updated to the new data D2. A user may further update the data D2 that was updated by the information processing device 25 to data D3. In this case, the data D2 will become the old data, and the data D3 will become the new data. The management device 10 will encrypt the new data D3 with the old data D2 as a key. The previously updated old data D2 is stored in the information processing device 25. The information processing device 25 can decrypt the encrypted new data E(D3, D2) with the old data D2 as a key. In this way, the old data D2 can be updated with the new data D3. According to this communication system 2, old data (e.g., an old password) will become a key and the encryption and decryption of new data will be performed. In other words, the sending of data to be updated in the information processing device 25 (e.g., a password) from the management device 10 to the information processing device 25 will occur together with the sending of an encryption key. This communication system 2 can transmit an encryption key in a novel way.

DETAILED DESCRIPTION OF THE PREFERRED EMBODIMENT (First Embodiment)

Figure 2:
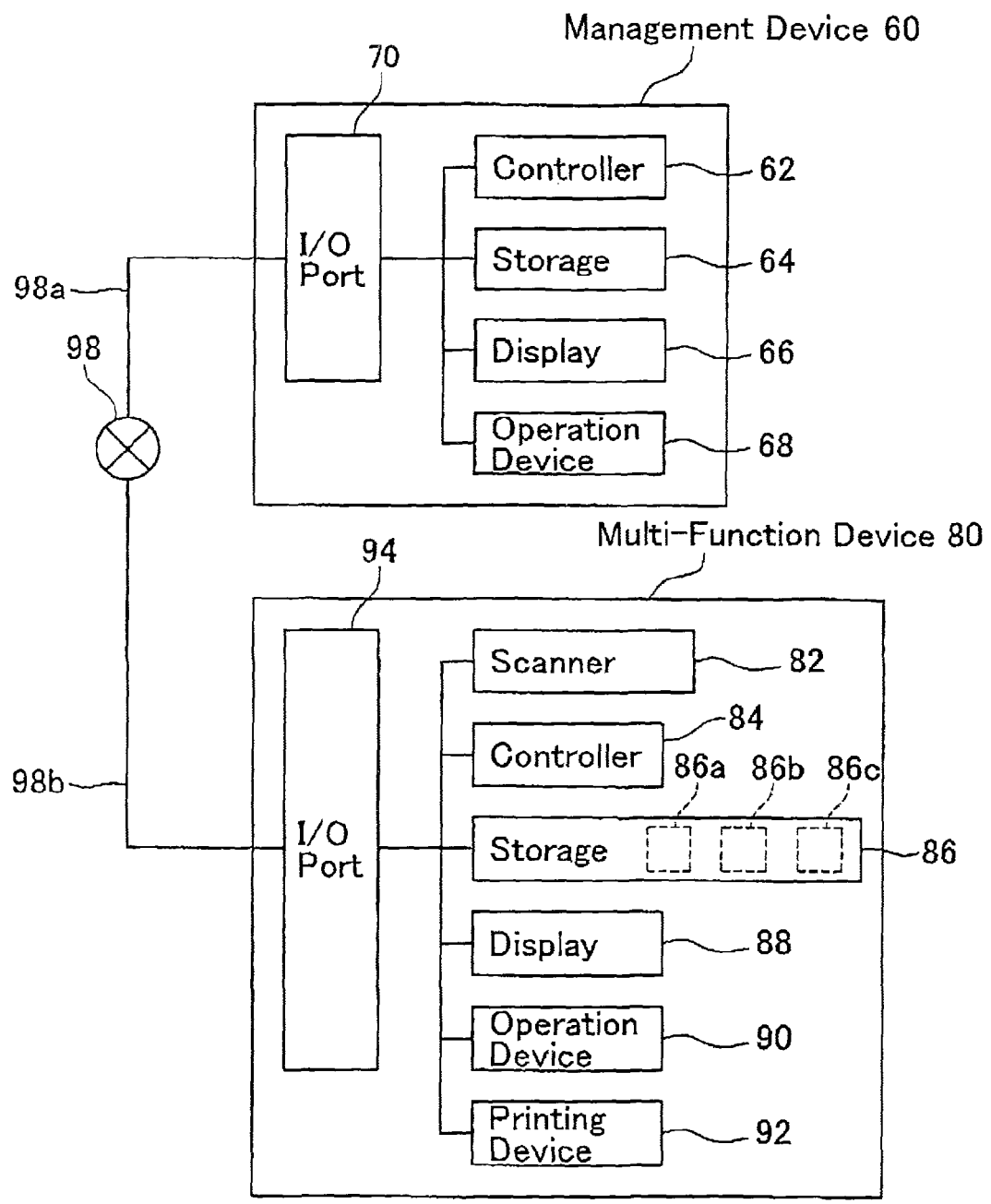
FIG. 2 shows an embodiment of a communication system.

An embodiment will be described with reference to the drawings. FIG. 2 shows a communication system 50 of the present embodiment. The communication system 50 has a management device 60 and a multi-function device 80. The management device 60 and the multifunctional device 80 are communicably connected together by means of the Internet 98.

(Construction of the Management Device)

The management device 60 has a controller 62, a storage 64, a display 66, an operation device 68, an input/output port 70, etc. The controller 62 includes a CPU etc. The controller 62 will comprehensively control each process that the management device 60 performs. The storage 64 includes ROM, RAM, EEPROM, etc. The storage 64 stores programs that allow the controller 62 to perform each process. The storage 64 stores programs for outputting a password that was input by a user to the multi-function device 80, programs for updating the password of management device 60 stored in the multi-function device 80, etc. In addition, the storage 64 can temporarily store data used in the steps performed by each process. The display 66 is comprised of a liquid crystal display. etc. The display 66 can display various types of data. The operation device 68 includes a mouse, keyboard, etc. A user can input various types of data into the management device 60 by operating the operation device 68. An internet line 98a is connected to the input/output port 70. The management device 80 is connected to the Internet 98 via the Internet line 98a. Note that in FIG. 2, only one management device 60 is illustrated. However, a plurality of management devices 60 is actually present. Each of the plurality of management devices 60 is connected to the Internet 98. The plurality of management devices 60 share usage of the multi-function device 80 described below.

(Construction of the Multi-function Device)

The multi-function device 80 has a scanner 82, a controller 84, a storage 86, a display 88, an operation device 90, a printing device 92, an input/output port 94, etc. The scanner 82 has a CCD (Charge Coupled Device) or a CIS (Contact Image Sensor). The scanner 82 will scan a document to produce image data. The controller 84 includes a CPU etc. The controller 84 will comprehensively control each process that the multi-function device 80 performs. The storage 86 includes ROM, RAM, EEPROM, etc. The storage 86 stores programs that allow the controller 84 to execute each process, and temporarily stores data used in the steps of each process that will be executed. The storage 86 of the present embodiment has at least a challenge storage area 86a, a password storage area 86b and a reproduction rule storage area 86c. Data stored by the challenge storage area 86a will be described in detail below. The password storage area 86b stores a combination of a login ID and password for logging the multi-function device 80. The password storage area 86b stores the combination of the login ID and password with respect to each management device 60. For example, when the login ID of the management device 60 is "XXX60" and the password is "YYYYY", a combination of "XXX60" and "YYYYY" is stored. The storage content of the reproduction rule storage area 86c will be described in detail below. The display 88 is comprised of a liquid crystal display, etc. The display 88 can display various types of data. The operation device 90 includes a plurality of keys. A user can input various types of data into the multi-function device 80 by operating the operation device 90. The printing device 92 will print image data created by the scanner 82 onto print media. An Internet line 98b is connected to the input/output port 94. The multi-function device 80 is connected to the Internet 98 via the internet line 98b the multi-function device 80 is connected to the plurality of management devices 60 via the Internet 98.

As noted above, the combination of the login ID and password is stored in the password storage area 86b of the multi-function device 80. A user of the management device 60 can use the operation device 68 to input the ID and password stored by the user into the management device 60. The management device 60 will output the inputted ID (e.g., "XXX60") and the inputted password (e.g., "YYYYY") to the multi-function device 80. The multi-function device 80 will determine whether or not the combination of the ID "XXX60" and the password "YYYYY" output from the management device 60 is stored in the password storage area 86b. In other words, the multi-function device 80 will perform user identification. The multi-function device 80 will perform processes in response to commands from the management device 60 in the case where user identification was successful. For example, the multi-function device 80 will change each type of setting data stored therein in response to commands from the management device 60. The multi-function device 80 will not perform the processes in response to commands from the management device 60 in the case where user identification was not successful. Note that it is preferable for a password sent from the management device 60 to the multi-function device 80 to be encrypted. The method of encryption to be employed here is a publicly known method. In addition, UDP/IP will be used to transmit data such as a password or the like between the management device 60 and the multi-function device 80.

A user of the management device 60 can change a password stored in the multi-function device 80. For example, in the case where a combination of the ID "XXX60" and password "YYYYY" is stored in the multi-function device 80, a user of the management device 60 can change the password "YYYYY" to a new password "ZZZZZ". The process that will be executed by the management device 60 and the multi-function device 80 when a password stored in the multi-function device 80 is to be changed (hereinafter referred to as a password updating process) will be described below.

(The Password Updating Process)

Figure 3:
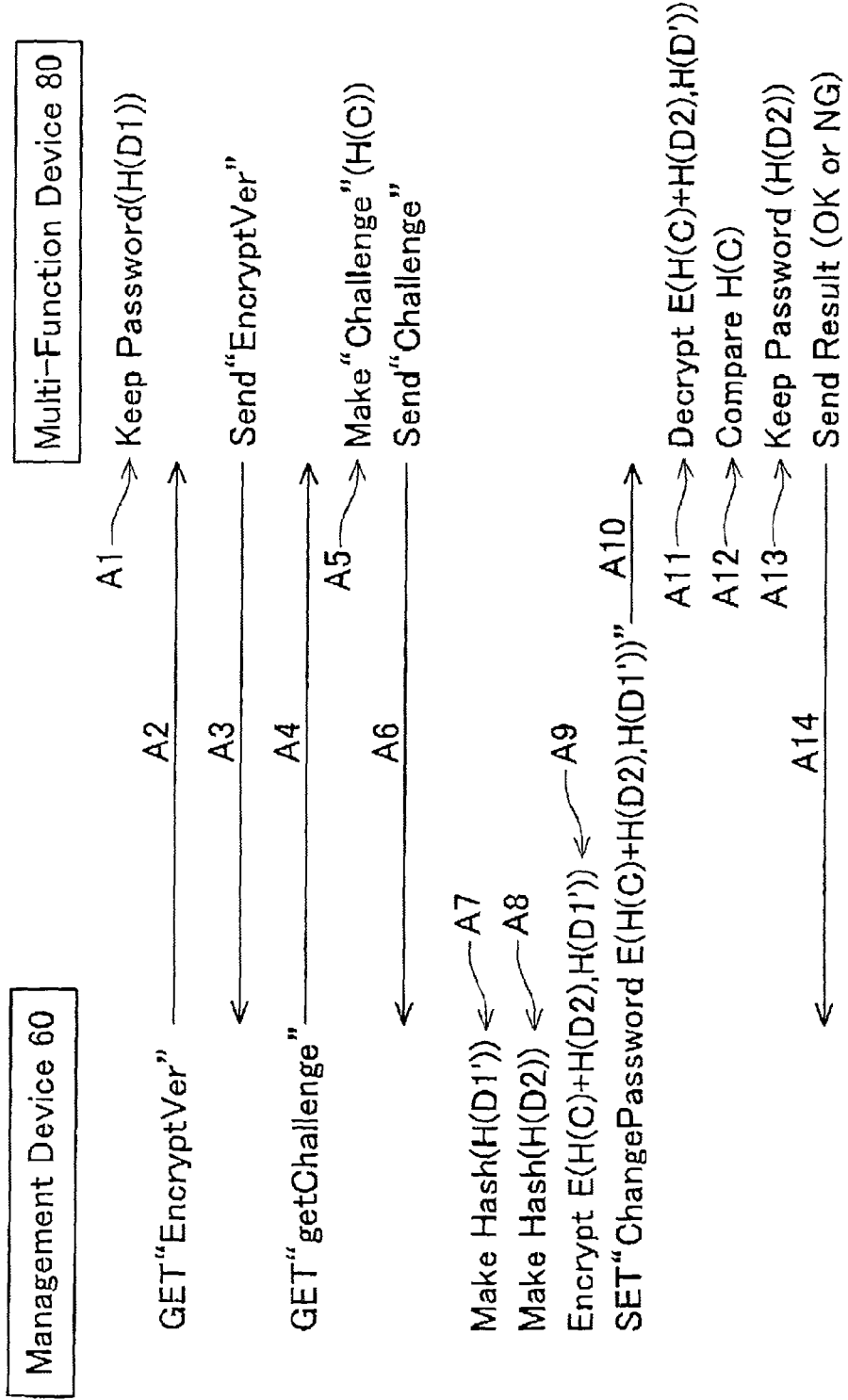
FIG. 3 shows a time chart of a password change process.

First, an example of the password updating will be described FIG. 3 shows a time chart of the password updating process executed by the management device 60 and the multi-function device 80.

(A1) The password of the management device 60 is stored in the password storage area 86b of the multi-function device 80 (see FIG. 2). The password has been hashed (digested).

If data is hashed, it will become a constant quantity, regardless of the quantity of the data. In the present embodiment, a SHA1 hash function (Secure Hash Algorithm 1) will be used to hash the data (in the case where SHA1 is used, the data will become 20 bytes after being hashed). A combination of the ID and hashed password H(D1) of the management device 60 is stored in the password storage area 86b.

(A2) If a user commands the management device 60 to update the password stored in the multi-function device 80, the management device 60 will query the multi-function device 80 as to whether or not the multi-function device 80 supports the encryption.

(A3) In the case where the multi-function device 80 supports the encryption, data indicating the encryption version will be output to the management device 60. In the case where the multi-function device 80 does not support the encryption, data indicating the non-encryption version will be output to the management device 60. Note that the description below will continue under the assumption that the multi-function device 80 supports (corresponds to) the encryption.

(A4) The management device 60 will request the multi-function device 80 to output challenge data.

(A5) The multi-function device 80 will create challenge data (a random number). The multi-function device 80 will hash the challenge data. The hashed challenge data will be hereinafter expressed as H(C). The hashed challenge data H(C) will be stored in the challenge storage area 86a (see FIG. 2).

(A6) The multi-function device 80 will output the hashed challenge data H(C) to the management device 60.

(A7) When a user is to update (change) a password stored in the multi-function device 80, the current password (i.e., the old password) for the management device 60 will be input into the management device 60. In the present specification, the current password will be expressed as D1. However, there is a possibility that a user inputs the incorrect password. The current password input by a user into the management device 60 will be hereinafter expressed as D1'. The management device 60 will hash the inputted old password D1'. The hashed old password will be hereinafter expressed as H(D1').

(A8) The user will input a new password D2 into the management device 60. The management device 60 will hash the inputted new password D2. The hashed new password will be hereinafter expressed as H(D2).

(A9) The management device 60 will encrypt data that is the combination of the challenge data H(C) input in A6 and the new password H(D2) created in A8 by utilizing the old password H(D1') created in A7 as a key. The construction of the combination data will be described in detail below. Note that the encrypted combination data will be hereinafter expressed as E(H(C)+H(D2), H(D1')).

(A10) The management device 60 will output the encrypted combination data E(H(C)+H(D2) H(D1')) to the multi-function device 80.

(A11) The multi-function device 80 will decrypt the encrypted combination data E(H(C)+H(D2), H(D1')) by utilizing the old password H(D1) stored in the password storage area 86b (see FIG. 2) as a key.

(A12) The multi-function device 80 will compare the challenge data I-l(C) included in the decrypted combination data (H(C)+H(D2)) with the challenge data H(C) stored in the challenge storage area 86a in A5. In the case where that the old password D1' that was input into the management device 60 by the user is the correct password D1, and the combination data E(H(C)+H(D2), H(D1')) was not altered during data transmission in A10, the two challenge data should match. On the other hand, in the case where the old password D1' that was input into the management device 60 by the user was not the correct password D1, the key (D1') for encrypting the combination data (H(C)+H(D2)) will not match the key (D1) for decryption. In this case, the decrypted challenge data A11 not match the challenge data stored in the challenge storage area 86a. In addition, in the case where the combination data E(H(C)+H(D2), H(D1')) was altered during data transmission in A10, the challenge data included in the combination data will become altered. In this case as well, the decrypted challenge data will not match the challenge data stored in the challenge storage area 86a.

(A13) In the case where the two challenge data compared in A12 match, the multi-function device 80 will update the old password H(D1) stored in the password storage area 86b (see FIG. 2) to the new password H(D2) included in the decrypted combination data (H(C)+H(D2)).

(A14) The multi-function device 80 will output to the management device 60 whether or not the update of password was allowed.

(Password Updating Process of the Management Device)

Figure 4:
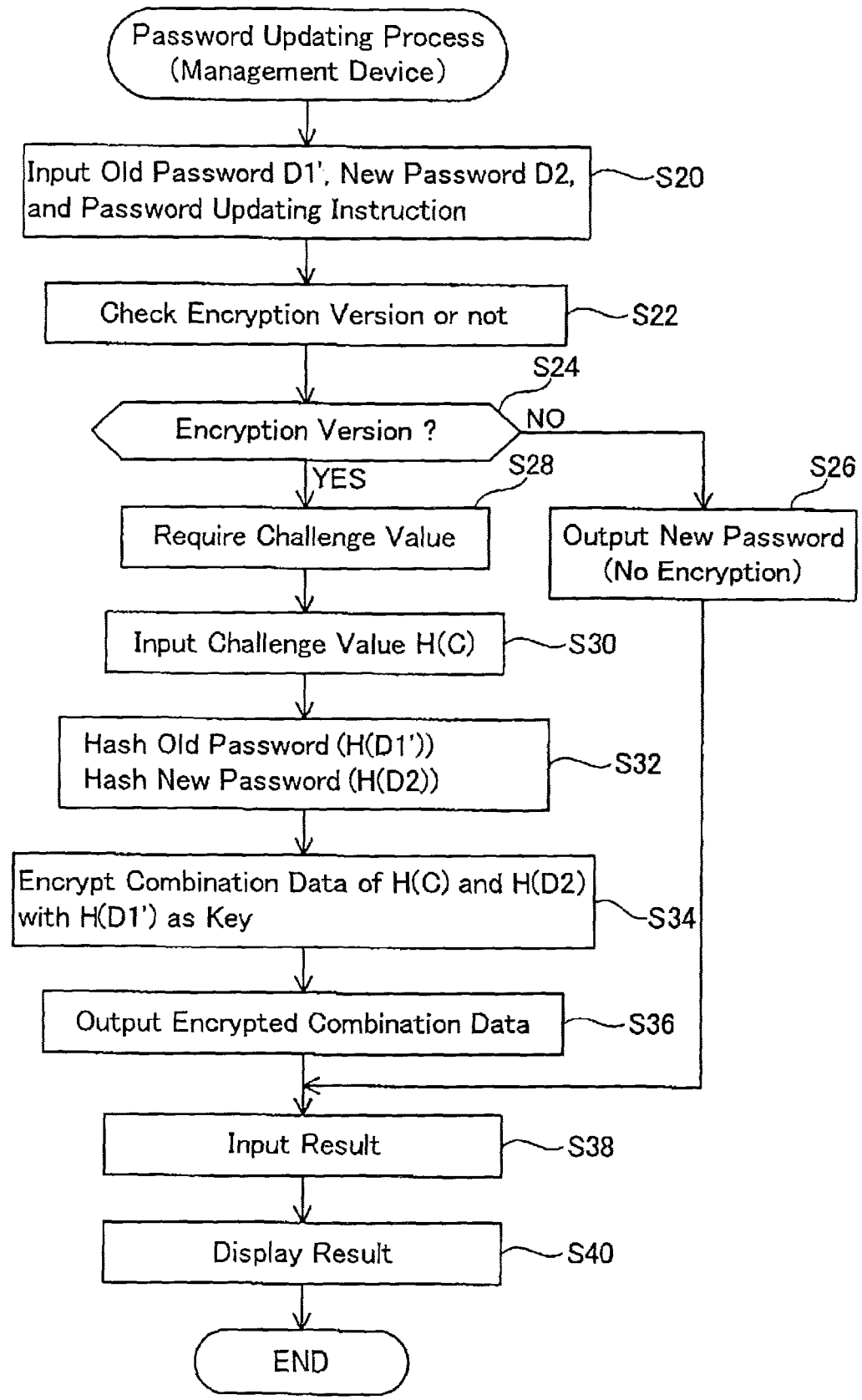
FIG. 4 shows a flowchart of a password updating process of a management device.

Next, the password updating process performed by the management device 60 will be described in detail. FIG. 4 shows the flowchart of the password updating process of the management device 60. The following process will be performed by the controller 62 (see FIG. 2) of the management device 60. A user of the management device 60 can input the current password (the old password), the new password, and a password updating instruction into the management device 60 by operating the operation device 68 (see FIG. 2). The management device 60 will input the old password D1', the new password D2, and the password updating instruction (S20). The management device 60 will query whether or not the multi-function device 80 supports the encryption (S22). This process corresponds to A2 of FIG. 3. The management device 60 will determine whether or not the multi-function device 80 supports the encryption (S24). In the case where the answer is NO here, the management device 60 will output the new password D2 to the multi-function device 80 (S26). The new password D2 will not be hashed when output, and will not be encrypted with the old password D1' as a key. When S26 is performed, the multi-function device 80 will update the old password D1 to the new password D2. Note that in S26, it is preferred that the old password D1' that was input by a user is output to the multi-function device 80. In this case, the multi-function device 80 will hash the old password D1'. In the case where the hashed old password H(D1') is stored in the password storage area 86b (see FIG. 2), it is preferable that the hashed old password D1 is updated to the hashed new password D2 in the multi-function device 80.

In the case where the answer is YES in S24, the management device 60 will order the multi-function device 80 to output the challenge data (S28). In this way, the challenge data H(C) will be sent from the multi-function device 80 to the management device 60. The process of S28 corresponds to A4 of FIG. 3. The management device 60 will input the challenge data H(C) (S30). The management device 60 will hash the old password D1' that was input in S20 (S32). In this way, the hashed old password H(D1') will be created. Furthermore, the management device 60 will hash the new password D2 that was input in S20 (S32). In this way, the hashed new password H(D2) will be created. The process of S32 corresponds to A7 and A8 of FIG. 3. The management device 60 will create data (H(C)+(D2)) that is a combination of the challenge data H(C) and the new password H(D2). The management device 60 will encrypt the combination data (H(C)+(D2)) with the old password H(D1) as a key (S34). The process of S34 corresponds to A9 of FIG. 3.

Figure 5A:
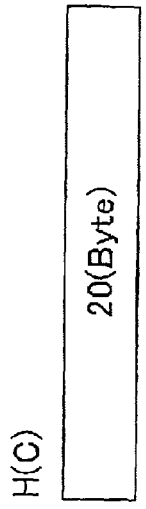
FIG. 5A shows hashed challenge data.
Figure 5B:
FIG. 5B shows a hashed new password.
Figure 5C:
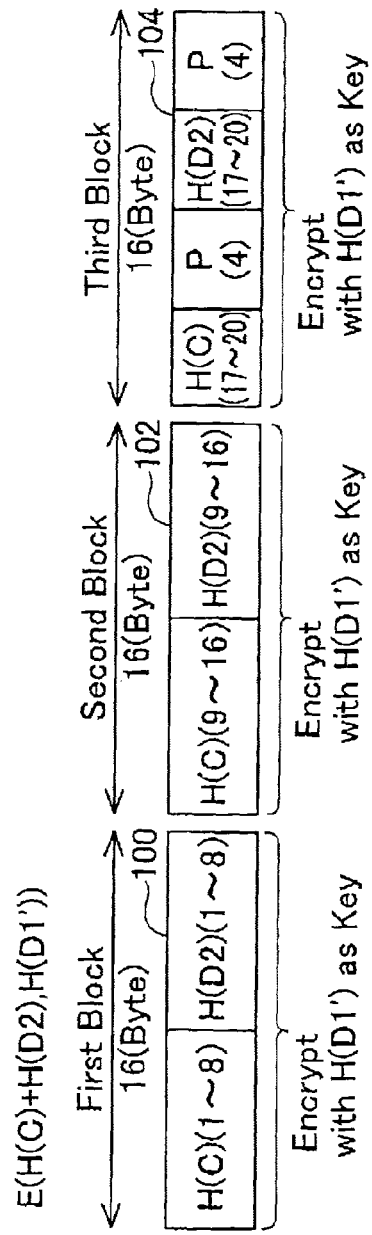
FIG. 5C shows combination data.

The content of the process of S34 will be described in detail with reference to FIG. 5. FIG. 5A shows the hashed challenge data H(C). The challenge data H(C) is 20 bytes. FIG. 53 shows the hashed new password H(D2). The new password H(D2) is 20 bytes. Note that the challenge data H(C) and the new password H(D2) will both become 20 bytes in order to use the SHA1.FIG. 5C shows the encrypted combination data E(H(C)+H(D2), H(D1')). The combination data E(H(C)+H(D2), H(D1')) will be created as described below.

(1) The 20 byte challenge data H(C) will be divided into a first divided challenge data from the first byte to the eighth byte, a second divided challenge data from the ninth byte to the sixteenth byte, and a third divided challenge data from the seventeenth byte to the twentieth byte.

(2) The 20 byte new password H(D2) will be divided into a first divided password data from the first byte to the eighth byte, a second divided password data from the ninth byte to the sixteenth byte, and a third divided password data from the seventeenth byte to the twentieth byte.

(3) Combination data arranged in the order of the first divided challenge data, the first divided password data, the second divided challenge data, the second divided password data, the third divided challenge data, and the third divided password data, will be created. The total quantity of this combination data will be 40 bytes.

(4) In the present embodiment, AES (Advanced Encryption Standard) will be used to encrypt the combination data in block units. The data quantity of one block to be encrypted with AES is a predetermined fixed value (e.g., 16 bytes. An example using 16 bytes will be described below). As noted above, the total quantity of this combination data will be 40 bytes. If the combination data is not a multiple of 16 bytes, it cannot be encrypted in block units. Because of this, 4 bytes of challenge dummy data will be added between the third divided challenge data and the third divided password data. In addition, and 4 bytes of password dummy data will be added after the third divided password data. In this way, the total quantity of combination data will be 48 bytes, and the combination data can be encrypted by three blocks 100, 102, and 104.

(5) Each block data 100, 102, and 104 will be encrypted with the old password H(D1') as a key. In order to encrypt one block data (e.g., 100) utilizing AES, a key for a predetermined quantity of data will be needed (this will be a key for 16 bytes in the present embodiment). In contrast, the old password H(D1') is 20 bytes. In the present embodiment, the first byte to the sixteenth byte of the old password H(D1') will be used as a key. In other words, the seventeenth byte to the twentieth byte of the old password H(D1') will not be used as a key.

The encrypted combination data E(H(C)+H(D2), H(D1')) includes three block data 100, 102, and 104. The first block data 100 includes eight bytes of the first divided challenge data and eight bytes of the first divided password data. The second block data 102 includes eight bytes of the second divided challenge data and eight bytes of the second divided password data. The third block data 104 includes four bytes of the third divided challenge data, four bytes of the challenge dummy data, four bytes of the third divided password data, and four bytes of the password dummy data. Both the divided challenge data and the divided password data are included in each of the block data 100, 102, and 104. In each block data 100, 102, and 104, the quantity of data in the divided challenge data and the divided password data included therein is the same.

When the encryption process of FIG. 4 (S34) is complete, the management device 60 will output the encrypted combination data E(H(C)+H(D2), H(D1')) to the multi-function device 80 (S36). In this way, a process in which the old password H(D1) is updated with the new password H(D2) is performed by the multi-function device 80. The process of S36 corresponds to A10 of FIG. 3. The management device 60 will input the result of the password updating process that was output from the multi-function device 80 (S38). The result of the password updating process is data indicating whether or not the password has been properly updated. The management device 60 will display the result of the password updating process on the display device 66 (see FIG. 2) (S40).
(Challenge Creating Process of the Multi-function Device)

Figure 6:
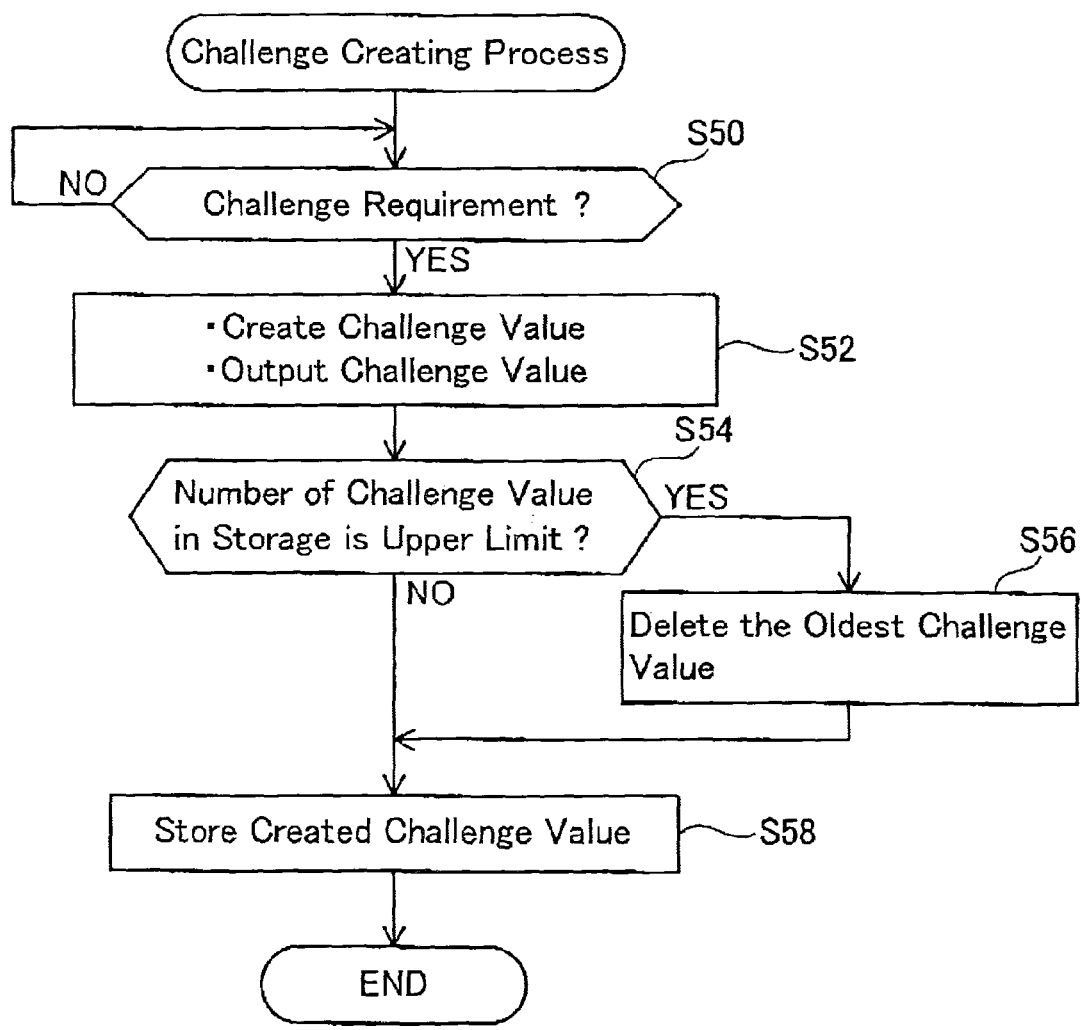
FIG. 6 shows a flowchart of a challenge creating process of a multi-function device.

Next, the challenge creating process performed by the multi-function device 80 will be described in detail. FIG. 6 shows the flowchart of the challenge creating process. The following process will be performed by the controller 84 (see FIG. 2) of the multi-function device 80. The multi-function device 80 will monitor whether or not the challenge data has been requested to be output from the management device 60. It will be determined that the answer is YES if the command output from the management device 60 in S28 of FIG. 4 is input. In the case where the answer is YES in S50, the multifunctional device 80 will produce a random number to acquire one random value (S52). This random value is challenge data (a challenge value). The multi-function device 80 will hash the challenge data in the process of S52. In this way, the hashed challenge data H(C) will be produced. In addition, the multi-function device 80 will output the challenge data H(C) to the management device 60. The process of S52 corresponds to A5 and A6 of FIG. 3. Next, the multi-function device 80 will determine whether or not the number of challenge data stored in the challenge storage area 86a of the storage 86 (see FIG. 2) exceeds an upper limit (e.g., 10). In the case where the answer is YES here, the oldest challenge data will be deleted from the challenge storage area 86a (S56). The multi-function device 80 will store the challenge data produced in S52 in the challenge storage area 86a (S58).
(Password Updating Process of the Multi-function Device)

Figure 7:
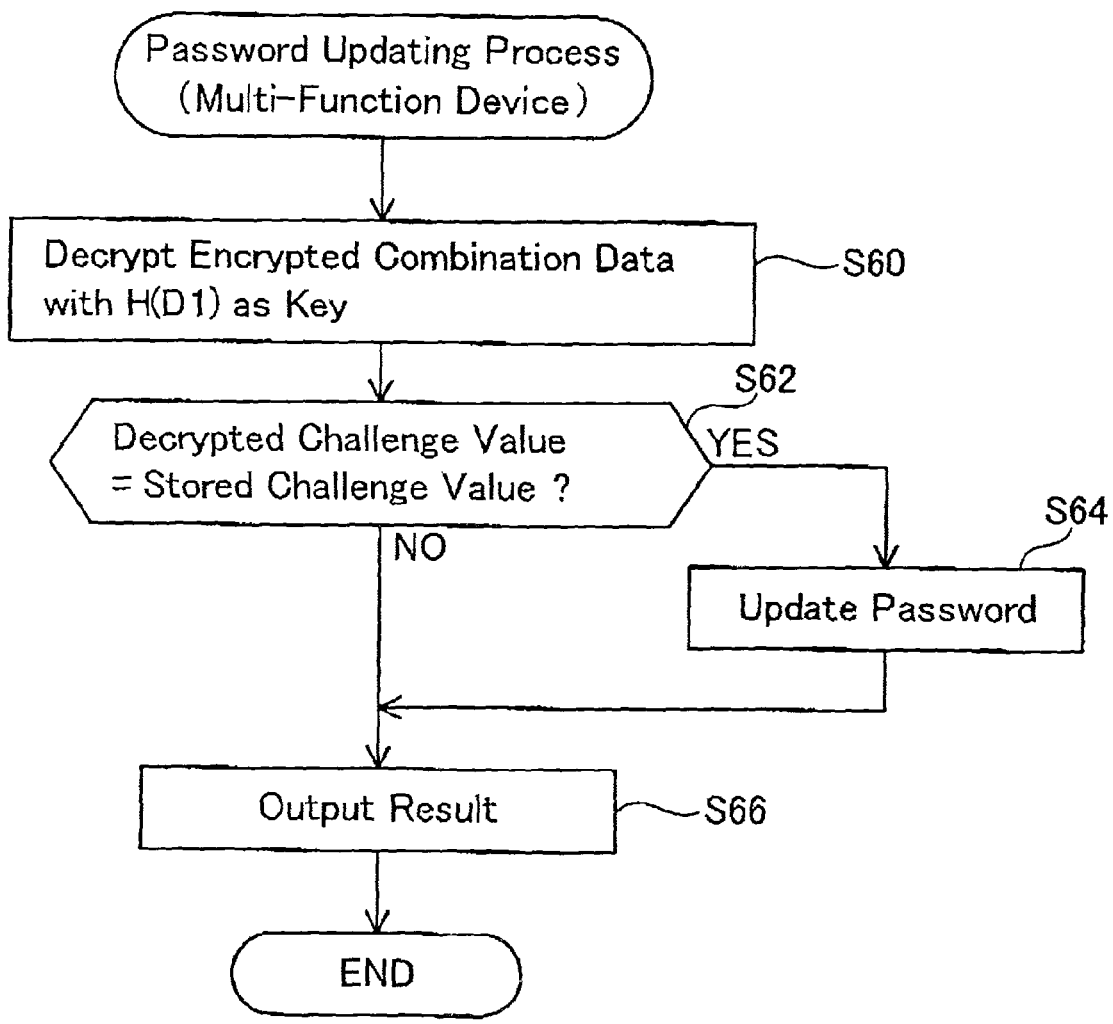
FIG. 7 shows a flowchart of a password updating process of the multi-function device.

Next, the password updating process performed by the multi-function device 80 will be described in detail. FIG. 7 shows the flowchart of the password updating process. The following process will be performed by the controller 84 (see FIG. 2) of the multi-function device 80. The multi-function device 80 will perform the password updating process when the combination data E(H(C)+H(D2), H(D1')) that was output from the management device 60 in S36 of FIG. 4 is input. The multi-function device 80 will decrypt the combination data E(H(C)+H(D2), H(D1')) with the old password H(D1) stored in the password storage area 86b as a key. The combination data E(H(C)+H(D2), H(D1')) includes a plurality of block data 100, 102, and 104 (see FIG. 5C). The multi-function device 80 will individually decrypt each of the plurality of block data 100, 102, and 104. That is, the multi-function device 80 will decrypt the combination data E(H(C)+H(D2), H(D1')) in units of the blocks. As noted above, each of the block data 100, 102, and 104 is encrypted by the leading 16 bytes (first byte to sixteenth byte) of the old password H(D1'). Because of this, the multi-function device 80 will use the leading 16 bytes of the old password H(D1) stored in the password storage area 86b to decrypt each block data 100, 102, and 104.

The reproduction and storage area 86c of the multi-function device 80 (see FIG. 2) stores the following data (rules for reproducing the challenge data and the new password).

(1) The eight bytes in the first half of the first block data 100 are challenge data (the first divided challenge data). The 8 bytes in the latter half are the new password (the first divided password data).
(2) The eight bytes in the first half of the second block data 102 are challenge data (the second divided challenge data). The 8 bytes in the latter half are the new password (the second divided password data).
(3) The four bytes from the leading portion of the third block data 104 are challenge data (the third divided challenge data). The next four bytes are dummy data. The next 4 bytes are the new password (the third divided password data). The last four bytes are dummy data.
(4) The challenge data H(C) can be reproduced when the challenge data of the first block data 100 is located at the leading portion, the challenge data of the second block data 102 follows thereafter, and the challenge data of the third block data 104 is last.
(5) The new password H(D2) can be reproduced when the new password of the first block data 100 is located at the leading portion, the new password of the second block data 102 follows thereafter, and the new password of the third block data 104 is last.

In the aforementioned process of S60 of FIG. 7, the challenge data and the new password will be reproduced in accordance with the aforementioned rules after the combination data (H(C)+H(D2), H(D1')) has been decrypted. The process of S60 corresponds to A11 of FIG. 3. Next, the multi-function device 80 will determine whether or not the challenge data decrypted in S60 is included in the challenge storage area 86a (see FIG. 2) (S62). In this way, the detected challenge data will be compared with the challenge data stored in the challenge storage area 86a in S58 of FIG. 6. The process of S62 corresponds to A12 of FIG. 3. In the case where the answer is YES in S62, the multi-function device 80 will delete the old password H(D1) stored in the password storage area 86b, and will store the new password H(D2) decrypted in S60 (S64). In this way, the old password H(D1) will be updated to the new password H(D2). The process of S64 corresponds to A13 of FIG. 3. In contrast, in the case where the answer in S62 is NO, the multi-function device 80 will skip S64. The multi-function device 80 will output the result of the password updating process to the management device 60 (S66). In the case where S66 is performed via S64, data indicating that the password updating process was successful will be output. In the case where S64 was skipped and S66 is performed, data indicating that the password updating process was not successful will be output. The management device 60 will display the result of the password updating process (see S40 of FIG. 4). The user can know whether or not the password updating was successful.

The management device 60 of the present embodiment will use the password H(D1') previously updated in the multi-function device 80 to encrypt the new password H(D2). The multi-function device 80 will decrypt-the encrypted new password E(H(C)+H(D2), H(D1')) with the previously updated old password H(D1) as a key. In this way, the old password H(D1) will be updated to the new password H(D2). For example, in the event that a user is to update a password D2 with a new password D3, the new password H(D3) will be encrypted with the password H(D2') as a key. The multi-function device 80 will decrypt the encrypted new password E(H(C)+H(D3), H(D2')) with the password H(D2) as a key. In this way, the old password H(D2) will be updated with the new password H(D3).

According to the communication system 50 of the present embodiment, the old password that was previously input into the management device 60 by a user and updated in the multi-function device 80 will become a key in order to encrypt and decrypt the new password. Because of this, other than the password to be updated in the multi-function device 80, there will be no need to transmit an encryption key between the management device 60 and the multi-function device 80. The communication system 50 of the present embodiment achieves transmission of an encryption key in a novel way.

In the event that the encrypted combination data E(C)+H(D2), H(D1')) is sent from the management device 60 to the multi-function device 80, that combination data may be altered. In this case, the challenge data included in the combination data will not match the challenge data stored in the challenge storage 86a because the challenge data included in the combination data is changed. In this case, the password will not be updated. Updating to an altered password can be prevented.

A user will input the old password D1' into the management device 60 when the password is to be updated. In the event that the old password D1' was not correctly input, the challenge data included in the decrypted combination data will not match the challenge data stored in the challenge storage area 86a because the encryption key and the decryption key do not match. In this case, the password will not be updated. According to the present embodiment, a password can be prevented from being updated in the event that the old password was not correctly input.

In addition, in the present embodiment, hashed data of a fixed size will be used. In this case, it is anticipated that data communication between the two devices 60, 80, the process in which each device 60, 80 uses the data, and the like, can be easily performed.

Figure 1:
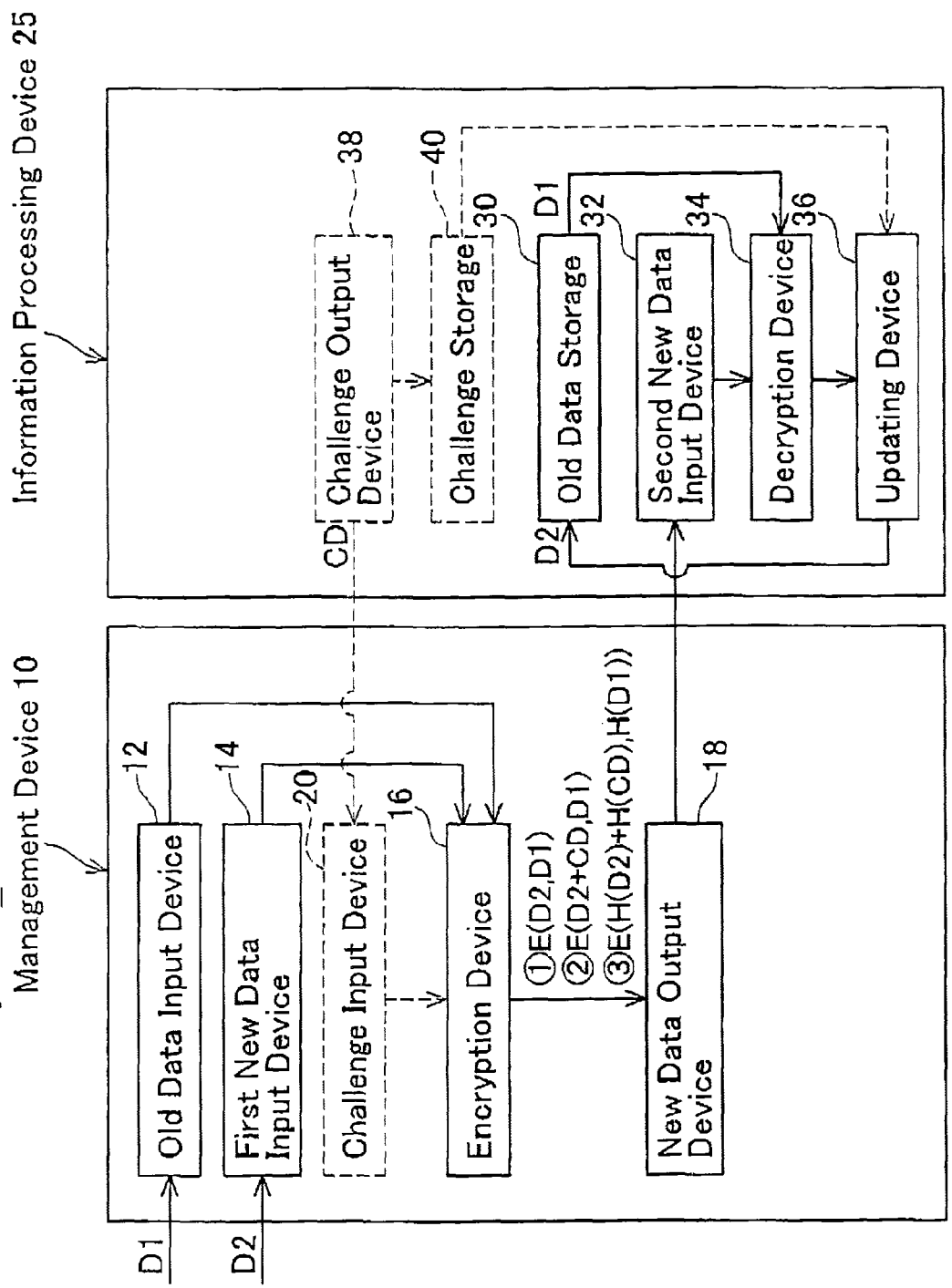
FIG. 1 shows an example of a communication system.

Some of the characteristics of the technology disclosed in the above embodiments will be described with reference to FIG. 1. The information processing device 25 may further comprise a challenge output device 38 that outputs challenge data CD to the management device 10, and a challenge storage 40 that stores the challenge data CD output by the challenge output device 38. In addition, the management device 10 may also comprises a challenge input device 20 that inputs the challenge data CD output by the information processing device 25. "Challenge data" is data for confirming that data communication has been safely performed between the information processing device 25 and the management device 10. The "challenge data" of the present specification may be data in any format. For example, the information processing device 25 can produce challenge data by randomly selecting one number.

In the case where the aforementioned challenge data is to be used, the management device 10 may also operate as follows. The encryption device 16 may encrypt combination data (D2+CD) including the new data D2 input to the first new data input device 14, and the challenge data CD input to the challenge input device 20, by utilizing the old data D1 input to the old data input device 12 as a key. In the following, the encrypted combination data will be expressed as E(D2+CD, D1). The new data output device 18 may output the combination data E(D2+CD, D1) encrypted by the encryption device 16 to the information processing device 25.

In addition, the information processing device 25 may also be operated as follows. The second new data input device 32 may input the encrypted combination data E(D2+CD, D1) that was output by the management device 10. The decryption device 34 may decrypt the encrypted combination data E(D2+CD, D1) that was input to the second new data input device 32, by utilizing the old data D1 stored in the old data storage 30 as a key. The updating device 36 may compare the challenge data CD included in the combination data (D2+CD) decrypted by the decryption device 34 with the challenge data CD stored in the challenge storage 40. In the case where both challenge data are identical, the updating device 36 may update the old data D1 stored in the old data storage 30 to the new data D2 included in the decrypted combination data (D2+CD). In the case where both challenge data are not identical, the updating device 36 may not update the old data D1 stored in the old data storage 30.

The following effects may be obtained when the challenge data CD is used.

(1) In the case where the encrypted combination data E(D2+CD, D1) is sent from the management device 10 to the information processing device 25, that combination data may be damaged. For example, the combination data may be altered by another device installed on the communication line (e.g., a router or the like). In this case, the challenge data included in the combination data does not match the challenge data stored in the challenge storage 40 because the challenge data included in the combination data is changed. The updating device 36 may not execute an update of the data in the case where the challenge data does not match. The data in the information processing device 25 can be prevented from being updated in the case where the combination data has been damaged during transmission.

(2) A user may input the old data D1 into the management device 10 when the old data D1 is to be updated with the new data D2. In the event that the old data D1 was not input correctly (e.g., in the event that D1' was input), the combination data (D2+CD) will be encrypted by the data D1' as a key. The encrypted combination data E(D2+CD, D1') will be decrypted by the old data D1. In this case, the challenge data included in the decrypted combination data does not match the challenge data CD stored in the challenge storage 40 because the encryption key does not match the decryption key. The updating device 36 may not execute an update of the data in the case where the challenge data does not match. The data in the information processing device 25 can be prevented from being updated in the event that the old data D1 was not correctly input by the user.

Digested data may also be used in the aforementioned communication system 2. Various methods can be used to digest the data. For example, a hash function can be used to digest (hash) the data. If the data is digested, the quantity of data can be made constant. In this case, it is anticipated that data communication between devices, the process in which each device uses the data, and the like, can be easily performed.

In the event that digested data is to be used, the management device 10 and the information processing device 25 may operate as follows. The old data storage 30 may store digested old data H(D1) obtained by digesting the old data D1. The challenge output device 38 may output digested challenge data H(CD) obtained by digesting the challenge data CD to the management device 10. The challenge storage 40 may store the digested challenge data H(CD) output by the challenge output device 38. The challenge input device 20 may input the digested challenge data H(CD) output by the information processing device 25. The encryption device 16 may create the digested old data H(D1) by digesting the old data D1 that was input to the old data input device 12, and create digested new data H(D2) by digesting the new data D2 that was input to the first new data input device 14. The encryption device 16 may also create combination data (H(D2)+H(CD)) from the digested new data H(D2) and the digested challenge data H(CD) that was input to the challenge input device 20. The encryption device 16 may encrypt the combination data (H(D2)+H(CD)) by utilizing the digested old data H(D1) as a key. In the following, the encrypted combination data will be expressed here as E(H(D2)+H(CD), H(D1)). The decryption device 34 may decrypt the encrypted combination data E(H(D2)+H(CD), H(D1)) that was input to the second new data input device 32, by utilizing the digested old data H(D1) s stored in the old data storage 30 as a key. The updating device 36 may compare the digested challenge data H(CD) included in the combination data (H(D2)+H(CD)) decrypted by the decryption device 34 with the digested challenge data H(CD) stored in the challenge storage 40. In the case where both challenge data are identical, the updating device 36 may update the digested old data H(D1) stored in the old data storage 30 to the digested new data H(D2) included in the decrypted combination data (H(D2)+H(CD)). The updating device 36 may not need to execute an update of the digested data H(D1) in the case where the challenge data does not match.

The communication system disclosed by the present embodiment can preferably use technology that will update passwords. Note that the word "password" of the present embodiment is a concept that includes any data such as text, numbers, symbols, or the like. The construction of the management device and the information processing device of a communication system that transmits passwords will be described below. These are easily understood by reference to the aforementioned FIG. 1

The management device comprises an old password input device, a first new password input device, an encryption device, and a new password output device. The first old password input device inputs an old password. In the case where a user is to update an old password stored in the information processing device with a new password, the user can input the old password that he or she has stored into the management device. On the other hand, the management device may continuously store an old password that was previously input by a user. According to this, a user need not input the old password into the management device when the old password is to be updated with a new password. The first new password input device inputs the new password. The encryption device creates a hashed old password by hashing the old password input to the first old password input device, create a hashed new password by hashing the new password input to the new password input device, and encrypt the hashed new password by utilizing the hashed old password as a key. The new password output device outputs the hashed new password encrypted by the encryption device to the information processing device.

The information processing device comprises an old password storage, a second new password input device, an encryption device and an updating device. The old password storage stores the hashed old password. The second new password input device inputs the encrypted hashed new password output by the management device. The decryption device decrypts the encrypted hashed new password input to the second new password input device, by utilizing the hashed old password stored in the old password storage as a key. The updating device updates the hashed old password stored in the old password storage to the hashed new password decrypted by the decryption device.

According to the aforementioned communication system, the sending of a password to be updated in the information processing device from the management device to the information processing device will occur together with the sending of an encryption key. Because of this, other than the password to be updated with the information processing device, there will be no need to transmit an encryption key between the management device and the information processing device. The communication system can transmit an encryption key in a novel way. In addition, the aforementioned communication system will transmit hashed data between the management device and the information processing device. The quantity of hashed data will be constant. In this cases it is anticipated that data communication between devices, the process in which each device uses the data, and the like can be easily performed.

The management device may also be a computer (PC) that is to be connected to the Internet. Alternately, the management device may be the other type of devices.

The information processing device may be a multi-function device that is to be connected to the Internet. The multi-function device may have at cast a scaring device and a printing device. The multi-function device may also function as an internet facsimile device. Alternately, the information processing device may be the other type of devices.

The information processing device may store a login password. The management device may output a password that was input by a user to the information processing device. The information processing device may input a password that was output by the management device.

The information processing device may compare the inputted password with the login password stored therein, and perform a process in response to a command from the management device in the case where both passwords match.

The information processing device may be communicably connected with a plurality of management devices. The information processing device may be shared by the plurality of management devices. The information processing device may store a login password with respect to each management device.

The management device may encrypt combination data (data that is a combination of new data and challenge data) in units of blocks. Each block may have a unit data size (predetermined data size). Tie information processing device may decrypt the combination data in units of the blocks.

The management device may create the encrypted combination data such that both at least a part of the challenge data and at least a part of the new data (e.g. new password) are included in at least one block of the encrypted combination data.

The management device may divide the challenge data into at least two divided challenge data, and create the encrypted combination data such that at least a part of the new data (e-g. new password) is arranged between one divided challenge data and the other divided challenge data.

The management device may create the encrypted combination data such that at least one divided challenge data is included in each block of the encrypted combination data.

The management device may divide the new data (e.g. new password) into at least two divided new data, and create the encrypted combination data such that both at least one divided challenge data and at least one divided new data are included in each block of the encrypted combination data.

The information processing device may store rules for reproducing the challenge data and the new data (e.g. new password) from the decrypted combination data.

Specific examples were described in detail above, however these are simply illustrations, and do not limit the scope of the claims The specific examples illustrated above include various modifications and changes that are within the technology disclosed in the present specification.

In addition, the technological components described in the present specification or the drawings exhibit technological utility individually or in various combinations, and are not limited to the combinations disclosed in the claims at the time of application. Furthermore, the technology illustrated in the present specification or the drawings simultaneously may achieve a plurality of objects, and has technological utility by achieving one of these objects.

What is claimed is:

1. A communication system comprising:
    an information processing device; and
    a management device configured to update old data stored in the information processing device by outputting new data to the information processing device,
    wherein the management device comprises:
        a challenge input device that inputs challenge data output by the information processing device;
        an old data input device that inputs the old data;
        a first new data input device that inputs the new data;
        an encryption device that encrypts combination data comprising the new data and the challenge data by utilizing the old data as a key; and
        a new data output device that outputs the encrypted combination data to the information processing device,
    wherein the information processing device comprises:
        a challenge output device that outputs the challenge data to the management device;
        a challenge storage that stores the challenge data output by the challenge output device;
        an old data storage that stores the old data;
        a second new data input device that inputs the encrypted combination data output by the management device;
        a decryption device that decrypts the encrypted combination data by utilizing the old data stored in the old data storage as a key; and
        an updating device that compares the challenge data included in the decrypted combination data and the challenge data stored in the challenge storage, wherein, when the decrypted challenge data and the stored challenge data are identical, the updating device updates the old data stored in the old data storage to the new data included in the decrypted combination data, and, when the decrypted challenge data and the stored challenge data are not identical, the updating device does not update the old data stored in the old data storage.

2. The communication system as in claim 1, wherein the old data stored in the old data storage is digested old data,
    the challenge data output by the challenge output device is digested challenge data,
    the challenge data stored in the challenge storage is the digested challenge data,
    the new data included in the combination data is digested new data,
    the challenge data included in the combination data is the digested challenge data,
    the old data utilized for encrypting the combination data as a key is the digested old data, the old data utilized for decrypting the encrypted combination data as a key is the digested old data stored in the old data storage, the updating device compares the digested challenge data included in the decrypted combination data and the digested challenge data stored in the challenge storage, and in a case where both digested challenge data are identical, the updating device updates the digested old data stored in the old data storage to the digested new data included in the decrypted combination data.

3. The communication system as in claim 1, wherein
the old data is an old password,
the new data is a new password, and
the management device is capable of updating the old password stored in the information processing device by outputting the new password to the information processing device.

4. The communication system as in claim 3, wherein
the old data stored in the old data storage is a hashed old password,
the challenge data output by the challenge output device is hashed challenge data,
the challenge data stored in the challenge storage is the hashed challenge data,
the challenge data input to the challenge input device is the hashed challenge data,
the new data included in the combination data is hashed new data,
the challenge data included in the combination data is the hashed challenge data,
the old data utilized for encrypting the combination data as a key is the hashed old data,
the old data utilized for decrypting the encrypted combination data as a key is the hashed old password stored in the old data storage, and
the updating device compares the hashed challenge data included in the decrypted combination data and the hashed challenge data stored in the challenge storage, and
when both the decrypted hashed challenge data and the hashed challenge data are identical, the updating device updates the hashed old password stored in the old data storage to a hashed new password including in the decrypted combination data.

5. The communication system as in claim 1, wherein the encryption device is configured:
to divide the challenge data into at least two divided challenge data;
to divide the new data into at least two divided new data;
to create the combination data including a plurality of blocks such that both of at least one divided challenge data and at least one divided new data are included in each block; and
the decryption device is configured:
to decrypt the encrypted combination data by utilizing the old data in block units;
to reproduce the challenge data by utilizing each divided challenge data included in each decrypted block; and
to reproduce the new data by utilizing each divided new data included in each decrypted block.

6. A management device to be connected with an information processing device in a communicable manner, the management device capable of updating old data stored in the information processing device by outputting new data to the information processing device, the management device comprising:

a processor; and
a storage memory storing instructions which instruct the processor to function as:
a challenge input device that inputs challenge data output by the information processing device;
an old data input device that inputs the old data which is an old password;
a first new data input device that inputs the new data which is a new password;
an encryption device that encrypts combination data including the new data and the challenge data by utilizing the old data as a key, the combination data including a plurality of blocks, each block having a predetermined data size; and
a new data output device that outputs the encrypted combination data to the information processing device.

7. The management device as in claim 6, wherein the encryption device is configured:
to divide the challenge data into at least two divided challenge data;
to divide the new data into at least two divided new data;
to create the combination data including the plurality of blocks, such that both at least one divided challenge data and at least one divided new data are included in each block; and
to encrypt the created combination data in block units by utilizing the old data.

8. The management device as in claim 6, wherein the challenge data input to the challenge input device is hashed challenge data,
the new data included in the combination data is a hashed new password,
the challenge data included in the combination data is the hashed challenge data, and
the old data utilized for encrypting the combination data as a key is a hashed old password.

9. An information processing device to be connected with a management device in a communicable manner, the information processing device capable of updating old data stored in itself to new data output by the management device, the information processing device comprising:
a challenge output device that outputs challenge data to the management device;
a challenge storage that stores the challenge data output by the challenge output device;
an old data storage that stores the old data which is an old password;
a second new data input device that inputs encrypted combination data output by the management device, the encrypted combination data including the new data, which is a new password, and the challenge data, the encrypted combination data including a plurality of blocks, each block having a predetermined data size;
a decryption device that decrypts the encrypted combination data by utilizing the old data stored in the old data storage as a key; and
an updating device that compares the challenge data included in the decrypted combination data and the challenge data stored in the challenge storage, wherein when both the decrypted challenge data and the stored challenge data are identical, the updating device updates the old data stored in the old data storage to the new data included in the decrypted combination data, and, when both the decrypted challenge data and the stored challenge data are not identical, the updating device does not update the old data stored in the old data storage.

10. The information processing device as in claim 9, wherein
  the old data stored in the old data storage is digested old data,
  the challenge data output by the challenge output device is digested challenges data,
  the challenge data stored in the challenge storage is the digested challenge data,
  the new data included in the combination data is the digested new data,
  the challenge data included in the combination data is the digested challenge data,
  the old data utilized for decrypting the encrypted combination data as a key is the digested old data stored in the old data storage,
  the updating device compares the digested challenge data included in the decrypted combination data and the digested challenge data stored in the challenge storage, and
  when both the decrypted digested challenge data and the stored digested challenge data are identical, the updating device updates the digested old data stored in the old storage to the digested new data included in the decrypted combination data.

11. The information processing device as in claim 9, wherein
  the old data stored in the old data storage a hashed old password,
  the challenge data output by the challenge output device is hashed challenge data,
  the challenge data stored in the challenge storage is the hashed challenge data,
  the new data included in the combination data is hashed new data,
  the challenge data included in the combination data is the hashed challenge data,
  the old data utilized for decrypting the encrypted combination data as a key is the hashed old password stored in the old data storage, and
  the updating device compares the hashed challenge data included in the decrypted combination data and the hashed challenge data stored in the challenge storage, and
  when both the decrypted hashed challenge data and the stored hashed challenge data are identical, the updating device updates the hashed old password stored in the old data storage to the hashed new password included in the decrypted combination data.

12. The information processing device as in claim 9, wherein:
  the encrypted combination data is created by the management device performing:
  dividing the challenge data into at least two divided challenge data;
  dividing the new data into at least two divided new data;
  creating the combination data including the plurality of blocks, such that both of at least one divided challenge data and at least one divided new data are included in each block; and
  encrypting the created combination data in block units by utilizing the old data,
  wherein the decryption device:
  decrypts the encrypted combination data by utilizing the old data in block units;
  reproduces the challenge data by utilizing each divided challenge data included in each decrypted block; and
  reproduces the new data by utilizing each divided new data included in each decrypted block.

13. A non-transitory computer readable storage medium for a management device, the management device capable of updating old data stored in an information processing device by outputting new data to the information processing device, the computer readable medium including instructions for instructing a computer mounted on the management device to perform:
  inputting challenge data output by the information processing device;
  encrypting combination data including the new data, which is a new password, and challenge
  data by utilizing the old data, which is an old password, as a key, the combination data including a plurality of blocks, each block having a predetermined data size; and
  outputting the encrypted combination data to the information processing device.

14. The non-transitory computer readable storage medium as in claim 13, wherein
  the step of encrypting further comprises:
  dividing the challenge data into at least two divided challenge data;
  dividing the new data into at least two divide new data;
  creating the combination data including a plurality of blocks, such that both of at least one divided challenge data and at least one divided new data are included in each block; and
  encrypting the created combination data in block units by utilizing the old data.

15. The non-transitory computer readable storage medium as in claim 13, wherein
  the old data stored in the information processing device is digested old data,
  the input challenge data is digested challenge data,
  the new data included in the combination data is digested new data,
  the challenge data included in the combination data is the digested challenge data,
  the old data utilized for encrypting the combination data as a key is the digested old data.

16. The non-transitory computer readable storage medium as in claim 13, wherein
  the input challenge data is hashed challenge data,
  the new data included in the combination data is a hashed new password,
  the challenge data included in the combination data is the hashed challenge data,
  the old data utilized for encrypting the combination data as a hashed old password.

17. A non-transitory computer readable storage medium for an information processing device, the information processing device capable of updating old data stored in itself to new data output by the management device, the computer readable medium including instructions for instructing a computer mounted on the information processing device to perform:
  outputting challenge data to the management device;
  storing the output challenge data;
  decrypting encrypted combination data output by the management device by utilizing the old data, which is an old password, stored in itself as a key, the encrypted combination data including the new data, which is a new password, and the challenge data, the encrypted combination data including a plurality of blocks, each block having a predetermined data size; comparing the challenge data included the decrypted combination data and the stored challenge data; and updating the old data stored in itself to the new data included in the decrypted combination data when both the decrypted and the stored challenge data are identical, wherein the old data stored in itself is not updated when both the decrypted and the stored challenge data are not identical.

18. A method for creating encrypted combination data using a management device, comprising the steps of:

dividing challenge data into at least two divided challenge data;

dividing new data which is a new password into at least two divided new data;

creating combination data including a plurality of blocks, each block having a predetermined data size, such that both of at least one divided challenge data and at least one divided new data are included in each block; and encrypting the created combination data in block units by utilizing old data which is an old password, and using a decryption device, comprising the steps of; decrypting the encrypted combination data by utilizing the old data in block units;

reproducing the challenge data by utilizing each divided challenge data included in each decrypted block; and reproducing the new data by utilizing each divided new data included in each decrypted block.

* * * * *